United States Patent [19]

Armstrong et al.

[11] Patent Number: 4,972,026

[45] Date of Patent: Nov. 20, 1990

[54] CHLORINATED TERPOLYMERS OF ETHYLENE

[75] Inventors: Adrian R. Armstrong, Buckhamshire; James W. Dawes, London, both of England

[73] Assignee: E. I. Du Pont de Nemours and Company, Wilmington, Del.

[21] Appl. No.: 275,959

[22] Filed: Nov. 25, 1988

Related U.S. Application Data

[63] Continuation-in-part of Ser. No. 198,768, May 20, 1988, abandoned.

[51] Int. Cl.$^5$ .............................................. C08F 8/22
[52] U.S. Cl. ............................... 525/329.7; 525/356; 525/357; 525/359.1
[58] Field of Search ...................................... 525/329.7

[56] References Cited

U.S. PATENT DOCUMENTS 3,364,187  1/1968  Wiggill ............................. 525/329.7

FOREIGN PATENT DOCUMENTS 0163970  12/1985  European Pat. Off. .
55-145769  11/1980  Japan .
55-145775  11/1980  Japan .
57-073005  5/1982  Japan .
1113510  5/1968  United Kingdom .

Primary Examiner—Bernard Lipman

[57] ABSTRACT

A chlorinated terpolymer of a precursor terpolymer containing 3-20 weight percent acrylic acid or methacrylic acid, 3-20 weight percent vinyl acetate and 60-90 weight percent ethylene contains 20-60 weight percent chlorine and has a Brookfield viscosity of about 150-600 cP when measured at 25° C. in xylene solution at a concentration of 25% by weight chlorinated terolymer. The chlorinated terpolymer contains 20-60 and preferably 25-55 weight percent chlorine.

5 Claims, No Drawings

CHLORINATED TERPOLYMERS OF ETHYLENE

RELATED APPLICATION

This application is a continuation-in-part of application Ser. No. 07/198,768, filed May 20, 1988 now abandoned.

BACKGROUND OF THE INVENTION

1. Field of the Invention

The present invention relates to chlorinated terpolymers of ethylene, methacrylic acid or acrylic acid, and vinyl acetate.

2. Prior Art

British Patent No. 1,113,510 discloses chlorinating copolymers of ethylene and acrylic acid.

Japanese Patent Application Publication Kokai No. 57-73005, published May 7, 1982, discloses an adhesive resin comprising a chlorinated terpolymer of ethylene, vinyl acetate and a carboxyl-containing monomer.

SUMMARY OF THE INVENTION

The present invention relates to chlorinated terpolymers which terpolymer precursors contain units derived from 3-20 weight percent methacrylic acid or acrylic acid monomers or mixtures thereof, from 3-20 weight percent vinyl acetate monomer and from 60-94 weight percent ethylene monomer, and which after chlorination contain from 20-60 weight percent chlorine and have a Brookfield viscosity of about 150-600 cP when measured at 25° C. in xylene solution at a concentration of 25% by weight chlorinated terpolymer. These compositions exhibit a superior combination of hardness and flexibility and superior corrosion resistance which renders the terpolymers especially useful as base resins for paints.

DETAILED DESCRIPTION OF THE INVENTION

The chlorinated terpolymers of the present invention contain units derived from 3-20 and preferably 6-12 weight percent acrylic acid or methacrylic acid monomers or mixtures thereof, from 3-20 and preferably 5-15 weight percent vinyl acetate monomer and the balance from ethylene to make 100%.

The acrylic acid or methacrylic acid serves to provide pendant carboxyl groups which serve as cure sites. The upper limit on the amount of acrylic acid or methacrylic acid is imposed by the desired shelf life of coating formulations based on the chlorinated resin and the lower limit is imposed by ability to crosslink the polymer. The number average molecular weight of the terpolymer before chlorination generally is 4,500–16,000. The base resin is chlorinated to a level of 20-60 weight percent chlorine with from 25-55 weight percent chlorine being preferred. If less than 20 wt % chlorine is present then the solubility of the polymer binder is inadequate in solvents commonly used in paint formulations and if more than 60 wt % chlorine is present, then the binder film is rendered hard and brittle as a result of the increase in glass transition temperature caused by chlorine incorporation.

In order for the chlorinated terpolymers of this invention to be useful as components of coating compositions they must have Brookfield viscosity values of from about 150-600 cP when measured at 25° C. in xylene solution at a concentration of 25% by weight chlorinated terpolymer, preferably about 300-450 cP. If the Brookfield viscosity of the chlorinated terpolymer binder is above 600 cP, the binder will impart too high a solution viscosity to the coating composition yielding coatings with poor application properties. If the chlorinated terpolymer binder has a Brookfield viscosity less than 150 cP, the resulting film will be unduly weak and when applied to a surface it will not result in a satisfactory coating.

The chlorinated terpolymers of the present invention can be prepared by free-radical solution chlorination in a solvent using chlorine gas at an elevated temperature and pressure and a free radical initiator.

The ethylene/(meth)acrylic acid/vinyl acetate terpolymer resin is dissolved in an organic solvent, such as a halogenated hydrocarbon, for example, chloroform, methylene chloride, tetrachloroethylene, chlorobenzene or, preferably, carbon tetrachloride, and the resin is reacted with gaseous chlorine. The amount of gaseous chlorine used in the process is determined by the degree of chlorination desired. Generally between about 0.5–2 parts by weight gaseous chlorine per part ethylene/(meth)acrylic acid/vinyl acetate copolymer resin are used to incorporate the desired amounts of chlorine atoms on the copolymer.

The temperature at which the chlorination reaction is carried out may be varied over a wide range and is generally governed by the viscosity of the solution and the decomposition temperature of the conventional free radical catalyst used in the process. Usually the temperature is between about 80–100° C. Generally the chlorination is conducted in the presence of conventional free radical initiators such as 2,2,'-azobis[2-methylpropane nitrile]. The resulting chlorinated ethylene/(meth)acrylic acid/vinyl acetate copolymers can be isolated by known means, preferably, drum drying. Other well known methods of isolation that can be used are, for example, precipitation, filtration, and spray drying or solvent exchange to a nonchlorinated solvent.

The above-described chlorinated ethylene/(meth)acrylic acid/vinyl acetate copolymers can be formulated into curable corrosion-resistant paint or coating compositions by any conventional means with pigments and fillers on, for example, a ball mill. The pigments used can be any of the conventional types used in coating compositions comprising, for example, iron oxides, lead oxides, strontium chromate, carbon black, coal dust, titanium dioxide, talc, barium sulfate, as well as color pigments, including cadmium yellow, cadmium red, chromium yellow, and metallic pigments such as aluminum flake.

Conventional fillers used in corrosion-resistant paints and coatings can be incorporated in the composition. Representative fillers include calcium carbonate, clay, talc, etc.

The corrosion-resistant paint or coating composition of the present invention contains about 20 to 30 percent by weight, usually 25 percent by weight, based on the total weight of the composition, of the chlorinated ethylene/(meth)acrylic acid/vinyl acetate copolymer and a solvent for the chlorinated copolymer. The solvent evaporates after the paint composition is applied to a substrate leaving the solid material to form a film or coating. The solvent is chosen so as to provide good viscosity characteristics. The solvent also assists in substrate wetting, and it promotes copolymer component compatibility, package stability and coalescence or film formation. Representative solvents that can be used include aromatic hydrocarbons such as toluene and xylene, halogenated aliphatic compounds such as carbon tetrachloride, chlorobenzene, chloroform and methylene chloride, ketones such as methyl ethyl ketone and methyl isobutyl ketone, monoethers of glycols such as the monoethers of ethylene glycol and diethylene glycol, as well as mixtures of the above. The solvent is present in the composition in amounts of about 45 to 50 percent by weight based on the total weight of the solvent and the chlorinated ethylene/(meth)acrylic acid/vinyl acetate copolymer component and the pigments and fillers present. The composition contains a relatively large amount of solids which provides good covering characteristics. The particular amount of solvent used is the amount which will result in a paint or coating composition having a solution viscosity determined in 30 percent by weight xylene of about 200–600 cP, usually, 300–500 cP, measured on a Brookfield viscometer. Generally, the utilization of the chlorinated ethylene/(meth)acrylic acid/vinyl acetate copolymer allows the addition of about 20–35 percent by weight fillers and pigments to give a total solids content of from 35–65 percent by weight.

In addition, plasticizers, antioxidants, anticorrosion agents, U.V. light absorbers, flow control agents and other formulating additives can be used in the paint or coating composition if desired. These materials are optionally present in amounts up to 5 percent by weight based on the total solids in the corrosion-resistant paint or coating composition.

The corrosion-resistant paint or coating composition of the present invention is designed for application by solution coating.

The chlorinated terpolymers of the present invention have lower solution viscosities than comparable chlorinated ethylene/acrylic acid copolymers of the same melt index, acid content and chlorine content and exhibit better compatibility with other resins, and improved solubility.

Generally, the chlorinated ethylene/(meth)acrylic acid/vinyl acetate terpolymers are cured using a crosslinking agent that reacts with the pendant carboxyl groups of the acrylic acid under conditions of time and temperature generally employed by the coating industry, namely, 30–60 secs. and 200° C. peak metal temperature. However, for some uses it is unnecessary to cure the chlorinated ethylene/(meth)acrylic acid/vinyl acetate terpolymers. The crosslinking agents used are well known in the art and consist of melamine-formaldehyde or urea-formaldehyde resins and epoxy resins. The basic hexamethylolmelamine or dimethylolurea structures may be modified with n-butyl or isobutyl alcohol to change resin reactivity. Any modifying groups added to the melamine rings, such as butyl may also react and release the corresponding alcohols. In addition, the melamine-formaldehyde and urea-formaldehyde crosslinking agents are known to release methanol giving polyamide condensates. The chlorinated terpolymers of the present invention can also be cured using ultra-violet light or a combination of aliphatic amines and epoxy resins as disclosed in U.S. Pat. Nos. 4,578,286; 4,572,870 and 4,513,060.

The chlorinated terpolymers of the present invention are particularly useful in solution coating applications, such as coil coating, marine coatings, maintenance coatings and in paint formulations. The non-crosslinked chlorinated terpolymers of the present invention are useful in lacquers.

EXAMPLE 1

Into a 23 liter stirred autoclave were charged 1.36 kg ethylene/acrylic acid/vinyl acetate copolymer, weight ratio 79.6/4.4/16 having a melt index of 2560 ml/dg, and 18.2 kg of carbon tetrachloride. The polymer/solvent mixture heated to 106° C. with stirring while maintaining the pressure at 0.24 MPa until the polymer dissolved. Initiator solution (1% 2,2,'-azobis-[2-methylpropane nitrile]in chloroform) was added at a rate of 3.5 ml/min and the polymer solution was treated with chlorine gas at a rate of 10.6 g/min, until a total of 2.29 kg of chlorine was introduced. The autoclave pressure was allowed to decrease slowly causing the polymer solution to degas, releasing dissolved hydrogen chloride. Following this degassing step, sufficient stabilizer solution was added to provide 1.5% Epon 828 (condensation product of bisphenol A and epichlorohydrin with a neutralization equivalent of 180, dissolved in carbon tetrachloride) based upon final total weight of product. The autoclave was cooled and the product solution discharged and filtered. The chlorinated product was isolated from the process solvent as a film on a drum drier. Analysis of the product showed the presence of 45% bound chlorine and 0.64% residual carbon tetrachloride. The Brookfield viscosity of the chlorinated terpolymer was 325 cP when measured in xylene solution at 25° C. at a concentration of 25% by weight chlorinated terpolymer.

The ethylene/acrylic acid/vinyl acetate terpolymers reported in Table I under Examples 2–4 were chlorinated by the procedure used in Example 1.

TABLE I

|  | EXAMPLE 1 | EXAMPLE 2 | EXAMPLE 3 | EXAMPLE 4 |
|---|---|---|---|---|
| E%/AA%/VA% | 79.6/4.4/16 | 86.1/6.8/7.1 | 78/10/12 | 86.1/6.8/7.1 |
| Melt Index (ml/dg) | 2560 | 1500 | 2420 | 2500 |
| Charge |  |  |  |  |
| Polymer (kg) | 1.36 | 1.36 | 1.82 | 1.36 |
| CCl$_4$ (kg) | 18.2 | 18.2 | 21.9 | 18.2 |
| Temp. (°C.) | 106 | 105 | 108 | 105 |
| Initiator | 3.5 | 3.5 | 3.5 | 3.5 |
| Rate (ml/min) |  |  |  |  |
| Chlorine | 10.6 | 10.6 | 9.1 | 9.1 |
| Rate (gm/min) |  |  |  |  |
| Total (kg) | 2.29 | 2.54 | 2.91 | 1.91 |
| Analysis of Chlorinated |  |  |  |  |
| Terpolymer |  |  |  |  |
| Chlorine (%) | 45 | 43 | 45 | 38 |
| Res. CCl$_4$ | 0.64 | 1.10 | 1.02 | 0.90 |
| Brookfield viscosity, | 325 | 400 | 335 | 330 |

TABLE I-continued

| | EXAMPLE 1 | EXAMPLE 2 | EXAMPLE 3 | EXAMPLE 4 |
|---|---|---|---|---|
| cP* | | | | |

*Measured at 25° C. in xylene solution at a concentration of 25% by weight chlorinated terpolymer.

PAINT FILM COMPOSITION

A paint formulation was prepared from the polymer of Example 4 in the following manner. A pigment dispersion was made up by dissolving a 7.5 g sample of the chlorinated polymer of Example 4 in 30 g "Solvesso 100", mixed xylenes aromatic solvent, b.p. 165–174° C. After addition of 2 g Nuosperse 657 dispersing agent, 100 g TiPure R960 titanium dioxide pigment was stirred into the dispersion, and mixing was continued for 30 minutes. After this time, the slurry was passed through a Dynamill dispersing unit (0.4 l capacity, model 0.4–1.25H) charged with 1.5 mm zirconium oxide beads. To the pigment dispersion was added a solution of 62.5 g polymer of Example 4 and 43 g n-butylated melamine-formaldehyde crosslinking agent in a mixture of 52 g "Solvesso 100" xylene aromatic solvent and 82 g "Solvesso 200" xylene aromatic solvent, with stirring, yielding a homogenized paint. The paint contained 50 weight percent solids and had a Brookfield viscosity of 1200 cP.

The paint formulation was used to prepare films on 3×6 in (7.6×15.2 cm) metal and plastic coupons by depositing about 5 ml of liquid paint at one end and down drawing with a wire-wound drawdown bar (e.g., K-bar). This manually coated the substrate with approximately 150 microns of wet paint, which on drying and curing, yields 45 microns of dry film. The wet films coated on metal coupons were cured by placing in an air circulating oven at about 265° C. for 45–60 seconds to give a peak metal temperature of about 200° C. The plastic coupons were cured at 100° C. for 60 minutes. The properties of the cured films are reported in Table II.

TABLE II

| | Steel | Aluminum | Plastic |
|---|---|---|---|
| Dry film thickness ($\mu$) | 45 | 45 | 60 |
| Pull-off adhesion[1] (kg/cm$^2$) | 20 | 12 | 35 |
| Persoz Hardness[2] (sec) | 80 | 65 | — |
| 60° Gloss[3] | 70 | 33 | 80 |
| Mandrel Flexibility[4] (>30% elongation) | no cracks | no cracks | — |
| OT Flexibility | passes | passes | — |
| Taber Abrasion[5] (weight in mg/1000 turns) | — | — | 76 |

[1]Method 1504624-1978 (British Standard 3900: Part E10) using the Elcometer 106 Manual Adhesion Table.
[2]NFT 30-016.
[3]ASTM Method D523-60.
[4]ASTM Method D522-60.
[5]ASTM Method D4060-81.

We claim:

1. A chlorinated terpolymer which terpolymer precursor contains units derived from 3–20 weight percent methacrylic acid or acrylic acid monomers or mixtures thereof, from 3–20 weight percent vinyl acetate monomer and from 60–94 weight percent ethylene monomer, and which after chlorination contains from 20–60 weight percent chlorine, and have a Brookfield viscosity of about 150–600 cP when measured at 25° C. in xylene solution at a concentration of 25% by weight chlorinated terpolymer.

2. The chlorinated terpolymer of claim 1 in which the terpolymer precursor contains 5–15 weight percent units derived from vinyl acetate.

3. The chlorinated terpolymer of claim 2 wherein the terpolymer precursor contains from 6–12 weight percent units derived from acrylic acid or methacrylic acid.

4. The chlorinated terpolymer of claim 3 wherein from 25–55 weight percent chlorine is present.

5. The chlorinated terpolymer of claim 4 wherein the terpolymer precursor contains units derived from acrylic acid.

* * * * *